United States Patent [19]

Mollura

[11] 4,141,770
[45] Feb. 27, 1979

[54] METHOD OF MAKING A BAFFLED WATERBED

[76] Inventor: Carlos A. Mollura, 2824 Del Oro Pl., Fullerton, Calif. 91733

[21] Appl. No.: 796,853

[22] Filed: May 16, 1977

[51] Int. Cl.² .................. B29D 23/00; A47C 27/08
[52] U.S. Cl. ...................................... 156/218; 5/349; 5/350; 156/227; 156/297
[58] Field of Search ................... 5/365, 367, 368, 369, 5/370, 371, 341, 349, 350; 156/218, 212, 226, 297, 227; 297/DIG. 8

[56] References Cited

U.S. PATENT DOCUMENTS

| 622,239 | 4/1899 | Lane | 5/349 |
|---|---|---|---|
| 684,554 | 10/1901 | Sawtell | 5/350 |
| 2,655,369 | 10/1953 | Musilli | 5/350 |
| 3,825,172 | 7/1974 | Mollura | 150/0.5 |
| 3,840,921 | 10/1974 | Labianco | 5/371 |
| 4,025,975 | 5/1977 | Phillips et al. | 5/370 |
| 4,055,867 | 11/1977 | Phillips | 5/350 |

Primary Examiner—Mervin Stein
Assistant Examiner—Alex Grosz
Attorney, Agent, or Firm—Flam & Flam

[57] ABSTRACT

To achieve maximum strength and reliability, a bag for use as a waterbed mattress is formed entirely of lap welds, that is, without any butt welds. My U.S. Pat. No. 3,825,172 discloses a lap weld method in which a length of plastic material is rolled to form a tube, the ends being lapped and partially welded to leave an access opening to the inside of the bag. The tube is telescoped over a welding die having the cross sectional configuration of the mattress, but axially short. The tube is accordion folded about the thin form with the ends of the tube turned inwardly over the peripheral rims of the form. End pieces are then welded in place. The form is removed through the access opening and the partial weld completed by the aid of a separator stick removable through the fill hole. To baffle the bag without changing the foregoing process, baffles are formed as a pair of detachably connectable elements respectively welded to the opposite sides of the tube that later will form the top and bottom layers of the mattress. The elements being detached from each other, fold with the tube along sides of the welding die. As a final assembly step, the baffle elements are connected together by simple manipulations through a later closed gap in the lap weld of the tube or by manipulations from the outside of the completed bag. The connected baffles operate to damp wave motion of fluid in the bag.

3 Claims, 11 Drawing Figures

U.S. Patent  Feb. 27, 1979  Sheet 2 of 3  4,141,770

METHOD OF MAKING A BAFFLED WATERBED

FIELD OF INVENTION

This invention relates to bags for use as waterbed mattresses of the type shown and described in my U.S. Pat. No. 3,825,172 issued July 23, 1974 and entitled TUBULAR FLEXIBLE BAG WITH LAP WELDED ENDS. More particularly this invention relates to a method of incorporating baffles in such bags.

BACKGROUND OF THE INVENTION

The first waterbeds utilized a simple bag or bladder peripherally bounded by a frame, such as shown in U.S. Pat. No. 3,585,356 to Charles Hall. Such an arrangement made it possible to relieve the plastic bag from the work of confining the water within a boundary. The bag tension could then be reduced to zero, if so desired, so that the weight of a person could be supported primarily by buoyancy. Flotation was achieved. Many users found objectionable the continuing wave movement resulting once the body of water was disturbed. Soon there appeared various forms of baffle structures designed to damp wave motions. Generally these structures included elements welded at opposite ends to the top and bottom layers of the bag. Manufacture has been a problem. Thus the baffles must be welded in place in progressive rows, leaving access to the interior of the bag during the process. Ultimately the outer layers of the bag must be sealed together. Some of the welds, of necessity, will be butt welds which are structurally inferior to lap welds.

The primary object of the present invention is to provide a baffle structure for a waterbed mattress in which the baffles are securely installed in a bag that is entirely lap welded. Another object of the present invention is to provide a means for incorporating baffles in a lap welded waterbed mattress bag made in accordance with my prior U.S. Pat. No. 3,825,172 issued July 23, 1974 and entitled TUBULAR FLEXIBLE BAG WITH LAP WELDED ENDS.

SUMMARY OF INVENTION

In my said prior patent, a tube of flexible plastic material is telescoped and bunched over a heat welding form, the ends of the tube being folded inwardly over rims of the form. End closure pieces are then placed on the form over the inwardly turned tube ends and welded in place. The form is removed through a lateral opening in the tube. The opening is sealed by the aid of a separator stick ultimately pulled through the fill hole. The novel baffle structure compatible with this method of manufacture comprises two sets of baffle elements, one set being located along one side of the tube corresponding to the top of the waterbed mattress bag, and the other set being located along the other side of the tube corresponding to the bottom of the bag. These baffle elements are positioned along opposite sides of the heat welding form as the tube is telescoped over the welding die or form. Accordingly, the baffle elements do not interfere with the placement and attachment of the closure pieces. After the bag is removed from the form, detachable fasteners of the baffle elements are connected by manipulations through a gap in the lap weld of the tube or through the flexible bag itself after the gap is closed.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 1:
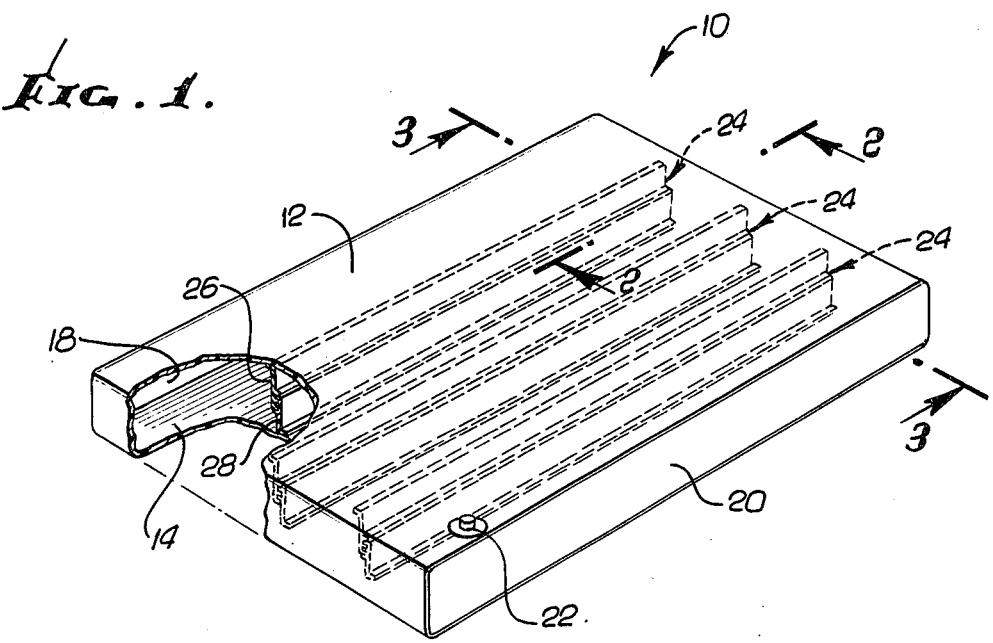
FIG. 1 is a pictorial view of a waterbed mattress bag incorporating the present invention, part of the bag being broken away and shown in section.
Figure 2:
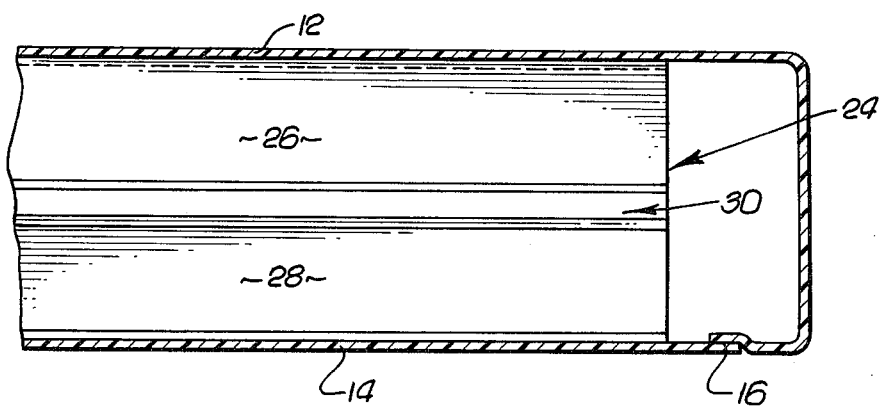
FIG. 2 is an enlarged fragmentary longitudinal sectional view showing one end of the bag and taken along a plane corresponding to line 2—2 of FIG. 1.
Figure 3:
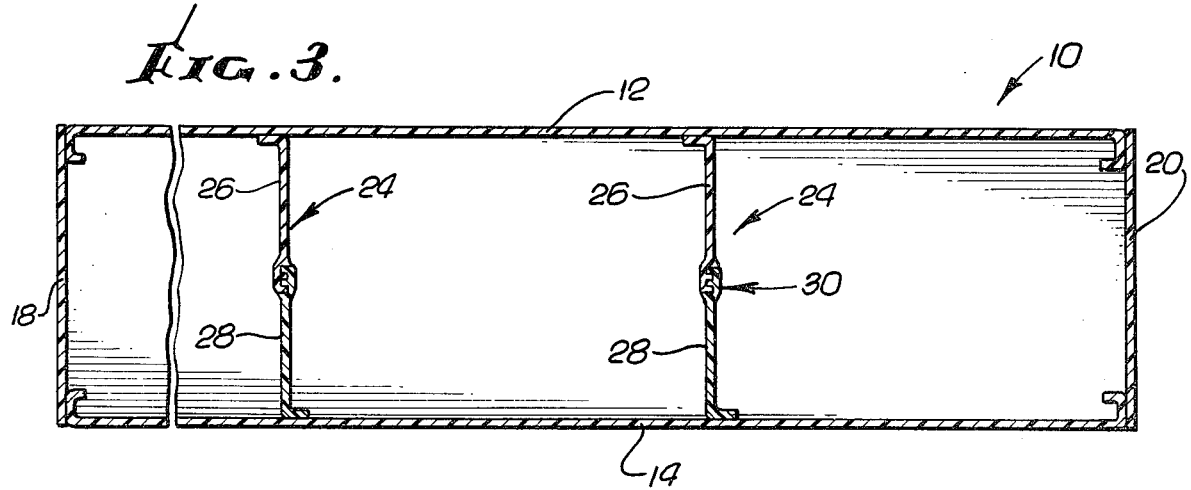
FIG. 3 is an enlarged transverse sectional view taken along a plane corresponding to line 3—3 of FIG. 1.

The waterbed mattress bag 10 shown in FIG. 1 is in the form of a rectangular parallelepiped in order to fit a corresponding well provided by a frame structure (not shown). The bag has a top layer 12 and bottom layer 14 formed by one piece of sheet plastic material. Thus, as shown in FIG. 2, the sheet is looped longitudinally of the mattress and joined along a transverse lap weld 16. Closure pieces 18 and 20 at the open ends of the loop to complete the enclosure. A filler plug 22 is provided for admission and removal of water.

Extending between the top and bottom layers of the bag are a series of baffles 24 that serve to limit lateral or horizontal movement of the water in the bag. In the present instance, the baffles 24 are in the form of strips of plastic material extending in spaced relationship parallel to the side closure pieces. The baffles 24 terminate short of the bag ends to form a series of channels that connect with each other.

Movement of water in all directions is largely restrained so that the wave motions imparted by rapid displacement of water at one region of the bag are quickly damp.

Each of the baffles is made of two elements, each being a strip about half the thickness of the mattress, one element 26 being thermally welded along the inside of the top 12 and the other element 28 being welded along the inside of the bottom 14. The distal ends of the baffle elements are snap connected together by interdigitating flange strips 30, formed as an integral part of the baffle elements.

Figure 4:
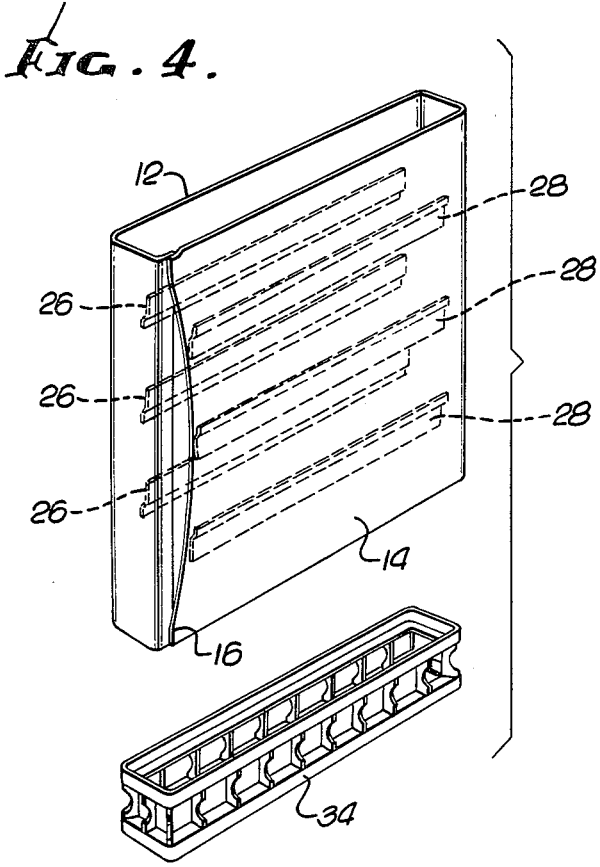
FIG. 4 is a diagrammatic view illustrating how the tube is to be telescoped over the heat welding form or die.
Figure 6:
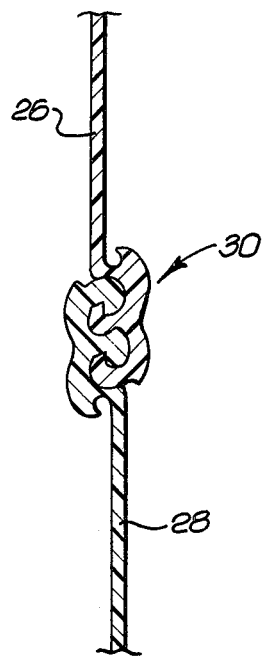
FIG. 6 is an enlarged fragmentary sectional view showing the detachable fasteners of companion baffle elements.
Figure 5:
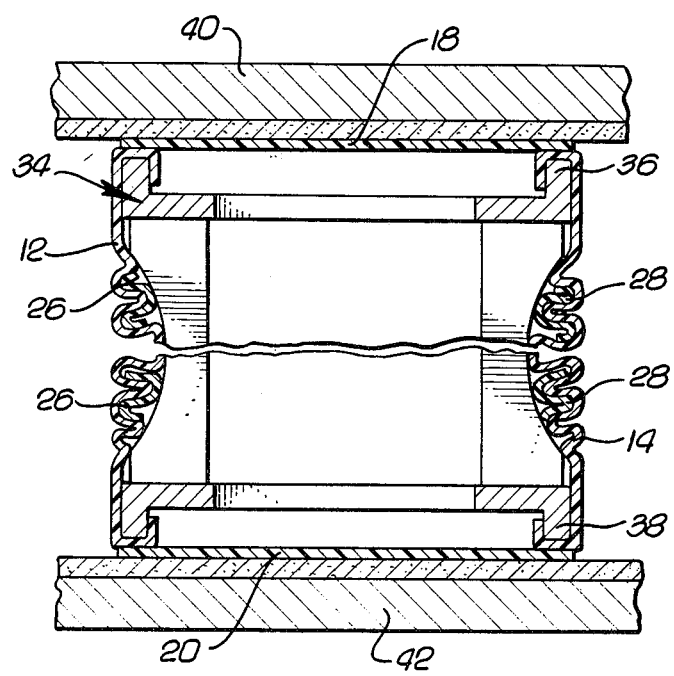
FIG. 5 is a fragmentary transverse sectional view through the welding die with the tube telescoped in place and closure or end pieces lap welded by plates of a dielectric welding machine.

The two part construction of the baffles allows the bag to be constructed in accordance with the method shown and described in my prior U.S. Pat. No. 3,753,819. The first step, as diagrammatically illustrated in FIG. 4, is to attach first and second sets of baffle elements along spaced portions of a sheet of material, the places of attachment corresponding to the top 12 and bottom 14 of the bag. The sheet is then looped to form a tube, the lap weld 16 being only partially formed to leave a central gap 32. The tube so formed is telescoped over the welding form or die 34. See also, FIG. 5. The baffle elements 26 and 28 fall along the sides of the form or die and are bunched together along with the folded top and bottom layers 14. The sides of the die are relieved in order to provide sufficient space for accommodating the baffle elements. As described in said patent, the ends of the tube are folded inwardly over rims 36 and 38 of the form or die and the closure pieces 18 and 20 are juxtapositioned. Dielectric plates 40 and 42 are closed about the die to generate sufficient heat completely to weld the end pieces 18 and 20 in place. The die or form 34 is removed through the gap 32 (FIG. 4) along with whatever clamping devices are required to hold the tube edges on the rims 36 and 38.

The companion flange strips 30 can now be manipulated through the gap 32 to connect them together. Finally, the gap 32 is closed by the method fully described in my said prior patent. Optionally, the flange strips can be connected together by manipulations through the outside of the flexible bag itself after the gap 32 is closed. In any case, a baffled waterbed mattress is provided in which all structural welds of the bag itself are lap welds. Forces tending to separate the welded components are resisted by the entire area of the lap weld, and not merely by the line of contact as would be the case with a butt weld. The two part construction of the baffles allows the use of the lap weld form or die 34.

DESCRIPTION OF ALTERNATIVE EMBODIMENTS

Figure 7:
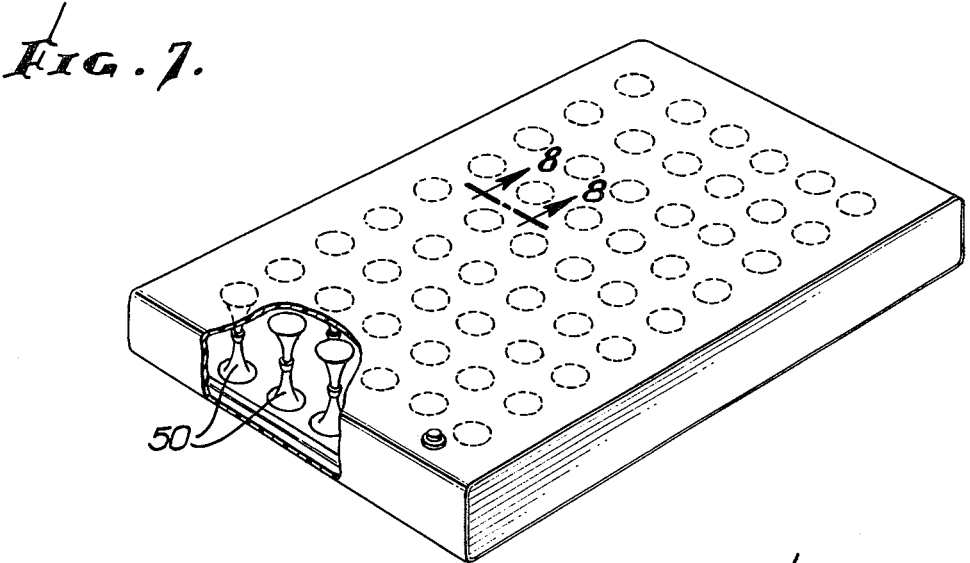
FIG. 7 is a view similar to FIG. 1, but illustrating a modified form of waterbed mattress bag.
Figure 8:
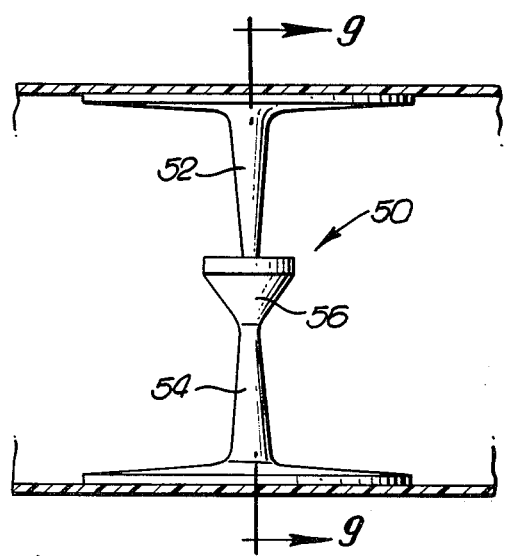
FIG. 8 is a fragmentary sectional view through the bag taken along a plane corresponding to line 8—8 of FIG. 7, and illustrating one of the baffle elements in side elevation.
Figure 9:
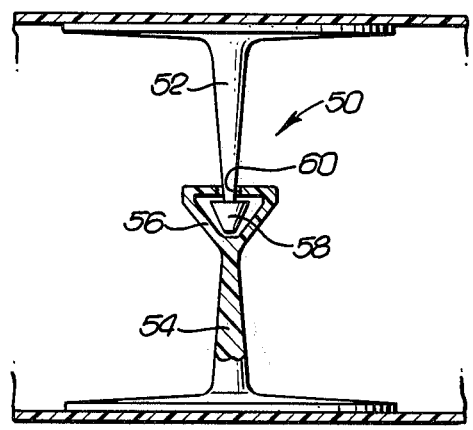
FIG. 9 is a sectional view taken along a plane corresponding to line 9—9 of FIG. 8.

In the form shown in FIGS. 7, 8 and 9, the baffles 50 are formed by companion cone elements 52 and 54 joined at their distal ends by a socket 56 in one of the elements and a head 58 on the other. The head 58 enters a restricted access opening 60 in the socket until the head snaps into place. As before, the individual baffle elements can be positioned along the sides of the welding die or form 34 during lap welding of the end pieces of the bag later to be connected together as previously described.

Figure 10:
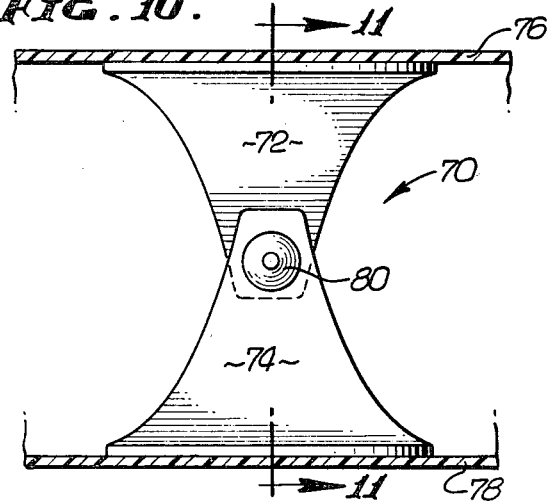
FIGS. 10 and 11 are views similar to FIGS. 8 and 9, but showing another modified form of baffle structure.
Figure 11:
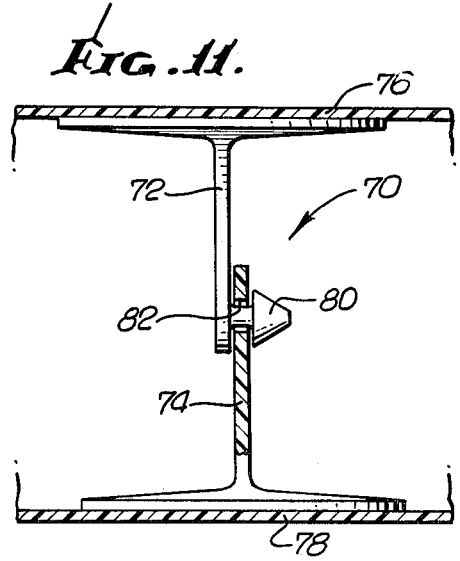

In the form shown in FIGS. 10 and 11, each baffle 70 comprises a pair of generally triangular strips 72 and 74. One side of the strip 72 is welded to the bag top 76 along a line generally paralleling the end pieces (not shown). One side of the strip 74 is similarly welded to the bag bottom 78 along a parallel line. As in the previous form the baffles are arrayed in rows extending parallel to the end pieces. This orientation of the baffle elements facilitates the positioning of the elements along the sides of the welding die or form.

The distal ends of the baffle elements are provided with a companion button type fasteners. One of the baffle elements 72 carries a head or button 80 that snaps in place through an opening 82 provided by the companion baffle element. As described in connection with the prior forms of the invention, the detachable fasteners are connected together by manipulations through the gap in the tube lap weld or through the flexible bag itself.

Intending to claim all novel, useful and unobvious features shown or described, I make the following claims:

1. The process of making a lap welded substantially closed baffled bag which includes:
    (a) attaching at longitudinally spaced portions of a sheet of material, corresponding parts of two part baffle structures;
    (b) forming a tube by looping the sheet of material so that companion baffle parts are inside;
    (c) lap welding the ends of the sheet, but leaving a gap intermediate the ends of the weld so formed;
    (d) telescoping the tube over a die having rims at opposite ends spaced from each other substantially less than the designed length of the tube;
    (e) placing the end edges of the tube respectively adjacent the rims while gathering the central portion of the tube so that the respective baffle parts fall along opposite sides of the die;
    (f) inwardly folding the edges of the tube over the rims;
    (g) placing end members over the inwardly folded edges of the tube;
    (h) adhering the end members to the folded edges;
    (i) removing the die from the tube through the gap;
    (j) attaching the distal ends of the companion baffle parts together by the aid of detachable fasteners formed thereon; and
    (k) completing the lap weld of the tube by closing said gap.

2. The process as set forth in claim 1 in which said gap is closed as a last step of said process, said detachable fasteners being accessible for manipulation through said gap.

3. The process as set forth in claim 1 in which said baffle parts are attached together as the last step, said fasteners being manipulable through said sheet of material.

* * * * *